United States Patent
Li et al.

(10) Patent No.: US 7,907,662 B2
(45) Date of Patent: *Mar. 15, 2011

(54) FREQUENCY DOMAIN EQUALIZER FOR DUAL ANTENNA RADIO

(75) Inventors: Junqiang Li, Matawan, NJ (US); Mark David Hahm, Hartland, WI (US); Nelson R. Sollenberger, Farmingdale, NJ (US); Li Fung Chang, Holmdel, NJ (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/703,311

(22) Filed: Feb. 10, 2010

(65) Prior Publication Data
US 2010/0135377 A1 Jun. 3, 2010

Related U.S. Application Data

(63) Continuation of application No. 11/524,584, filed on Sep. 21, 2006, now Pat. No. 7,684,526.

(51) Int. Cl.
*H03H 7/30* (2006.01)

(52) U.S. Cl. .......................................... 375/229

(58) Field of Classification Search ........... 375/229, 375/30, 231
See application file for complete search history.

(56) References Cited

U.S. PATENT DOCUMENTS
| | | | |
|---|---|---|---|
| 6,574,293 B1 | 6/2003 | Khayrallah et al. | |
| 2004/0213339 A1 | 10/2004 | Smee et al. | |
| 2006/0072650 A1 | 4/2006 | Kent et al. | |

*Primary Examiner* — Kevin Y Kim
(74) *Attorney, Agent, or Firm* — Garlick Harrison & Markison; Bruce E. Garlick

(57) ABSTRACT

A Radio Frequency (RF) receiver includes a RF front end and a baseband processing module coupled to the RF front end that is operable to receive a time domain signal that includes time domain training symbols and time domain data symbols. The baseband processing module includes a channel estimator operable to process the time domain training symbols to produce a time domain channel estimate, a Fast Fourier Transformer operable to convert the time domain channel estimate to the frequency domain to produce a frequency domain channel estimate, a weight calculator operable to produce frequency domain equalizer coefficients based upon the frequency domain channel estimate, an Inverse Fast Fourier Transformer operable to converting the frequency domain equalizer coefficients to the time domain to produce time domain equalizer coefficients, and an equalizer operable to equalize the time domain data symbols using the time domain equalizer coefficients.

18 Claims, 8 Drawing Sheets

FREQUENCY DOMAIN EQUALIZER FOR DUAL ANTENNA RADIO

CROSS-REFERENCE TO PRIORITY APPLICATION

The present application is a continuation of and claims priority to U.S. Utility application Ser. No. 11/524,584, filed Sep. 21, 2006, now issued as U.S. Pat. No. 7,684,526, which is incorporated herein in its entirety for all purposes.

BACKGROUND

1. Technical Field

The present invention relates generally to wireless communication systems; and more particularly to the equalization of data communications by a wireless radio in a wireless communication system.

2. Related Art

Cellular wireless communication systems support wireless communication services in many populated areas of the world. Cellular wireless communication systems include a "network infrastructure" that wirelessly communicates with wireless terminals within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC). Each BSC also typically directly or indirectly couples to the Internet.

In operation, each base station communicates with a plurality of wireless terminals operating in its serviced cell/sectors. A BSC coupled to the base station routes voice communications between the MSC and the serving base station. The MSC routes the voice communication to another MSC or to the PSTN. BSCs route data communications between a servicing base station and a packet data network that may include or couple to the Internet. Transmissions from base stations to wireless terminals are referred to as "forward link" transmissions while transmissions from wireless terminals to base stations are referred to as "reverse link" transmissions. The volume of data transmitted on the forward link typically exceeds the volume of data transmitted on the reverse link. Such is the case because data users typically issue commands to request data from data sources, e.g., web servers, and the web servers provide the data to the wireless terminals.

Wireless links between base stations and their serviced wireless terminals typically operate according to one (or more) of a plurality of operating standards. These operating standards define the manner in which the wireless link may be allocated, setup, serviced, and torn down. Popular currently employed cellular standards include the Global System for Mobile telecommunications (GSM) standards, the North American Code Division Multiple Access (CDMA) standards, and the North American Time Division Multiple Access (TDMA) standards, among others. These operating standards support both voice communications and data communications. More recently introduced operating standards include the Universal Mobile Telecommunications Services (UMTS)/Wideband CDMA (WCDMA) standards. The UMTS/WCDMA standards employ CDMA principles and support high throughput, both voice and data.

The wireless link between a base station and a serviced wireless terminal is referred to as a "channel." The channel distorts and adds noise to wireless transmissions serviced by the channel. "Channel equalization" is a process employed by a wireless receiver, e.g., wireless terminal, in an attempt to obviate the effects of the channel. While channel equalization is certainly helpful in obviating the effects of the channel, the characteristics of the channel are constantly changing. Thus, coefficients of a channel equalizer must be continually updated. However, generating coefficients of the channel equalizer is a difficult and time consuming process. Thus, a need exists for an improved methodology for determining equalizer coefficients.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
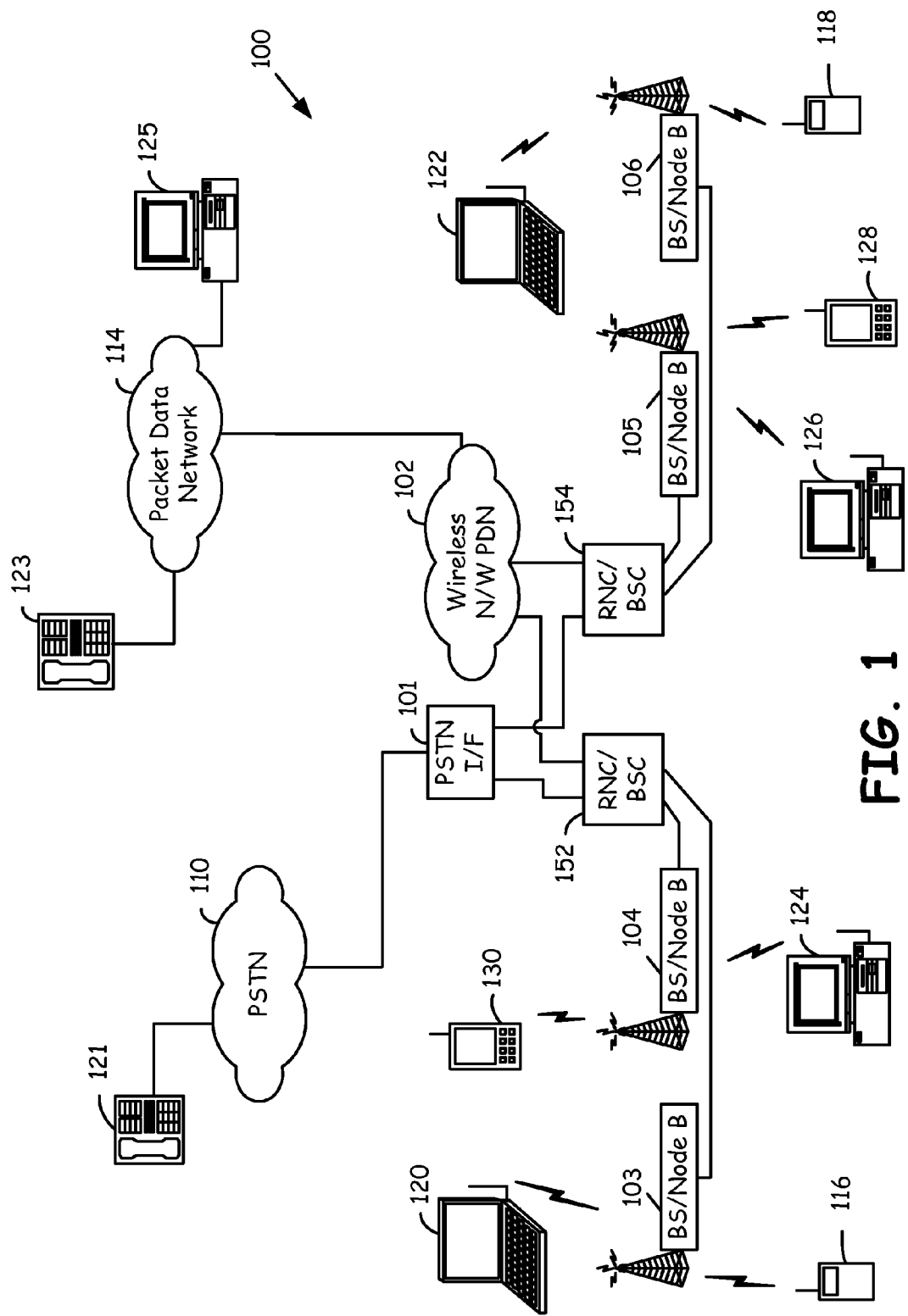
FIG. 1 is a system diagram illustrating a portion of a cellular wireless communication system that supports wireless terminals operating according to the present invention.

FIG. 1 is a system diagram illustrating a portion of a cellular wireless communication system 100 that supports wireless terminals operating according to the present invention. The cellular wireless communication system 100 includes a Public Switched Telephone Network (PSTN) Interface 101, e.g., Mobile Switching Center, a wireless network packet data network 102 that includes GPRS Support Nodes, EDGE Support Nodes, WCDMA Support Nodes, and other components, Radio Network Controllers/Base Station Controllers (RNC/BSCs) 152 and 154, and base stations/node Bs 103, 104, 105, and 106. The wireless network packet data network 102 couples to additional private and public packet data networks 114, e.g., the Internet, WANs, LANs, etc. A conventional voice terminal 121 couples to the PSTN 110. A Voice over Internet Protocol (VoIP) terminal 123 and a personal computer 125 couple to the Internet/WAN 114. The PSTN Interface 101 couples to the PSTN 110. Of course, this particular structure may vary from system to system.

Each of the base stations/node Bs 103-106 services a cell/set of sectors within which it supports wireless communications. Wireless links that include both forward link components and reverse link components support wireless communications between the base stations and their serviced wireless terminals. These wireless links support digital data communications, VoIP communications, and digital multimedia communications. The cellular wireless communication system 100 may also be backward compatible in supporting analog operations as well. The cellular wireless communication system 100 supports one or more of the UMTS/WCDMA standards, the Global System for Mobile telecommunications (GSM) standards, the GSM General Packet Radio Service (GPRS) extension to GSM, the Enhanced Data rates for GSM (or Global) Evolution (EDGE) standards, one or more Wideband Code Division Multiple Access (WCDMA) standards, and/or various other CDMA standards, TDMA standards and/or FDMA standards, etc.

Wireless terminals 116, 118, 120, 122, 124, 126, 128, and 130 couple to the cellular wireless communication system 100 via wireless links with the base stations/node Bs 103-106. As illustrated, wireless terminals may include cellular telephones 116 and 118, laptop computers 120 and 122, desktop computers 124 and 126, and data terminals 128 and 130. However, the cellular wireless communication system 100 supports communications with other types of wireless terminals as well. As is generally known, devices such as laptop computers 120 and 122, desktop computers 124 and 126, data terminals 128 and 130, and cellular telephones 116 and 118, are enabled to "surf" the Internet (packet data network) 114, transmit and receive data communications such as email, transmit and receive files, and to perform other data operations. Many of these data operations have significant download data-rate requirements while the upload data-rate requirements are not as severe. Some or all of the wireless terminals 116-130 are therefore enabled to support the EDGE operating standard, the GPRS standard, the UMTS/WCDMA standards, the HSDPA standards, the WCDMA standards, and/or the GSM standards.

Figure 2:
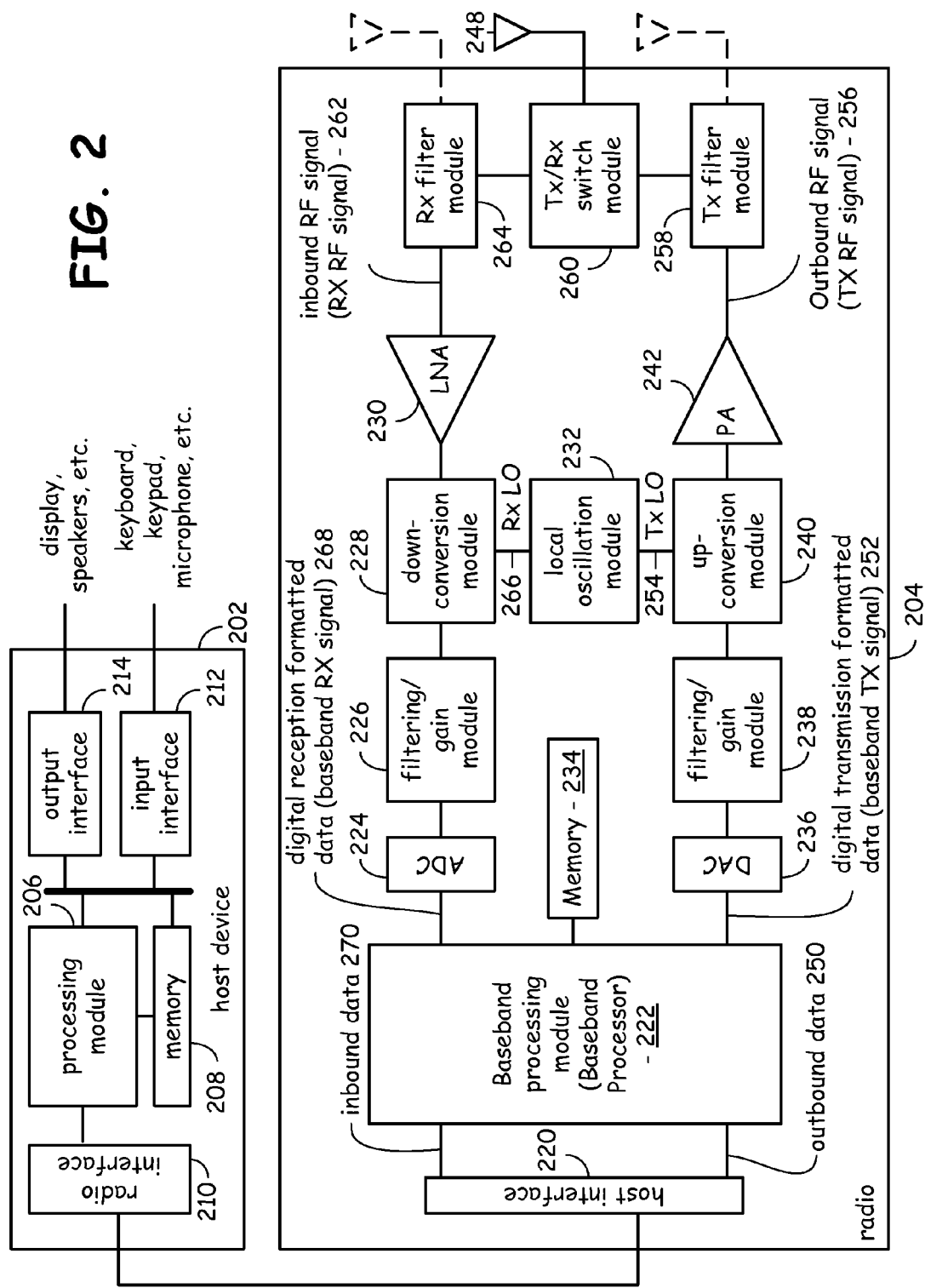
FIG. 2 is a block diagram functionally illustrating a wireless terminal constructed according to the present invention.

FIG. 2 is a block diagram functionally illustrating a wireless terminal constructed according to the present invention. The wireless terminal includes host processing components 202 and an associated radio 204. For cellular telephones, the host processing components and the radio 204 are contained within a single housing. In some cellular telephones, the host processing components 202 and some or all of the components of the radio 204 are formed on a single Integrated Circuit (IC). For personal digital assistants hosts, laptop hosts, and/or personal computer hosts, the radio 204 may reside within an expansion card or upon a mother board and, therefore, be housed separately from the host processing components 202. The host processing components 202 include at least a processing module 206, memory 208, radio interface 210, an input interface 212, and an output interface 214. The processing module 206 and memory 208 execute instructions to support host terminal functions. For example, for a cellular telephone host device, the processing module 206 performs user interface operations and executes host software programs among other operations.

The radio interface 210 allows data to be received from and sent to the radio 204. For data received from the radio 204 (e.g., inbound data), the radio interface 210 provides the data to the processing module 206 for further processing and/or routing to the output interface 214. The output interface 214 provides connectivity to an output display device such as a display, monitor, speakers, et cetera such that the received data may be displayed. The radio interface 210 also provides data from the processing module 206 to the radio 204. The processing module 206 may receive the outbound data from an input device such as a keyboard, keypad, microphone, et cetera via the input interface 212 or generate the data itself. For data received via the input interface 212, the processing module 206 may perform a corresponding host function on the data and/or route it to the radio 204 via the radio interface 210.

Radio 204 includes a host interface 220, baseband processing module 222 (baseband processor) 222, analog-to-digital converter 224, filtering/gain module 226, down conversion module 228, low noise amplifier 230, local oscillation module 232, memory 234, digital-to-analog converter 236, filtering/gain module 238, up-conversion module 240, power amplifier 242, RX filter module 264, TX filter module 258, TX/RX switch module 260, and antenna 248. Antenna 248 may be a single antenna that is shared by transmit and receive paths (half-duplex) or may include separate antennas for the transmit path and receive path (full-duplex). The antenna implementation will depend on the particular standard to which the wireless communication device is compliant.

The baseband processing module 222 in combination with operational instructions stored in memory 234, execute digital receiver functions and digital transmitter functions. The digital receiver functions include, but are not limited to, digital intermediate frequency to baseband conversion, demodulation, constellation demapping, descrambling, and/or decoding. The digital transmitter functions include, but are not limited to, encoding, scrambling, constellation mapping, modulation, and/or digital baseband to IF conversion. The transmit and receive functions provided by the baseband processing module 222 may be implemented using shared processing devices and/or individual processing devices. Processing devices may include microprocessors, microcontrollers, digital signal processors, microcomputers, central processing units, field programmable gate arrays, programmable logic devices, state machines, logic circuitry, analog circuitry, digital circuitry, and/or any device that manipulates signals (analog and/or digital) based on operational instructions. The memory 234 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 222 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 204 receives outbound data 250 from the host processing components via the host interface 220. The host interface 220 routes the outbound data 250 to the baseband processing module 222, which processes the outbound data 250 in accordance with a particular wireless communication standard (e.g., UMTS/WCDMA, GSM, GPRS, EDGE, et cetera) to produce digital transmission formatted data 252. The digital transmission formatted data 252 is a digital base-band signal or a digital low IF signal, where the low IF will be in the frequency range of zero to a few kilohertz/megahertz.

The digital-to-analog converter 236 converts the digital transmission formatted data 252 from the digital domain to the analog domain. The filtering/gain module 238 filters and/or adjusts the gain of the analog signal prior to providing it to the up-conversion module 240. The up-conversion module 240 directly converts the analog baseband or low IF signal into an RF signal based on a transmitter local oscillation 254 provided by local oscillation module 232. The power amplifier 242 amplifies the RF signal to produce outbound RF signal 256, which is filtered by the TX filter module 258. The TX/RX switch module 260 receives the amplified and filtered RF signal from the TX filter module 258 and provides the output RF signal 256 signal to the antenna 248, which transmits the outbound RF signal 256 to a targeted device such as a base station 103-106.

The radio 204 also receives an inbound RF signal 262, which was transmitted by a base station via the antenna 248, the TX/RX switch module 260, and the RX filter module 264. The low noise amplifier 230 receives inbound RF signal 262 and amplifies the inbound RF signal 262 to produce an amplified inbound RF signal. The low noise amplifier 230 provides the amplified inbound RF signal to the down conversion module 228, which converts the amplified inbound RF signal into an inbound low IF signal or baseband signal based on a receiver local oscillation 266 provided by local oscillation module 232. The down conversion module 228 provides the inbound low IF signal (or baseband signal) to the filtering/gain module 226, which filters and/or adjusts the gain of the signal before providing it to the analog to digital converter 224. The analog-to-digital converter 224 converts the filtered inbound low IF signal (or baseband signal) from the analog domain to the digital domain to produce digital reception formatted data 268. The baseband processing module 222 demodulates, demaps, descrambles, and/or decodes the digital reception formatted data 268 to recapture inbound data 270 in accordance with the particular wireless communication standard being implemented by radio 204. The host interface 220 provides the recaptured inbound data 270 to the host processing components 202 via the radio interface 210.

As the reader will appreciate, all components of the radio 204, including the baseband processing module 222 and the RF front end components may be formed on a single integrated circuit. In another construct, the baseband processing module 222 and the RF front end components of the radio 204 may be formed on separate integrated circuits. The radio 204 may be formed on a single integrated circuit along with the host processing components 202. In still other embodiments, the baseband processing module 222 and the host processing components 202 may be formed on separate integrated circuits. Thus, all components of FIG. 2 excluding the antenna, display, speakers, et cetera and keyboard, keypad, microphone, et cetera may be formed on a single integrated circuit. Many differing constructs integrated circuit constructs are possible without departing from the teachings of the present invention. According to the present invention, the baseband processing module 222 equalizes the digital transmission formatted data (baseband TX signal) 252 in a novel manner. Various techniques for performing these equalization operations will be described further herein with reference to FIGS. 3-8.

Figure 3:
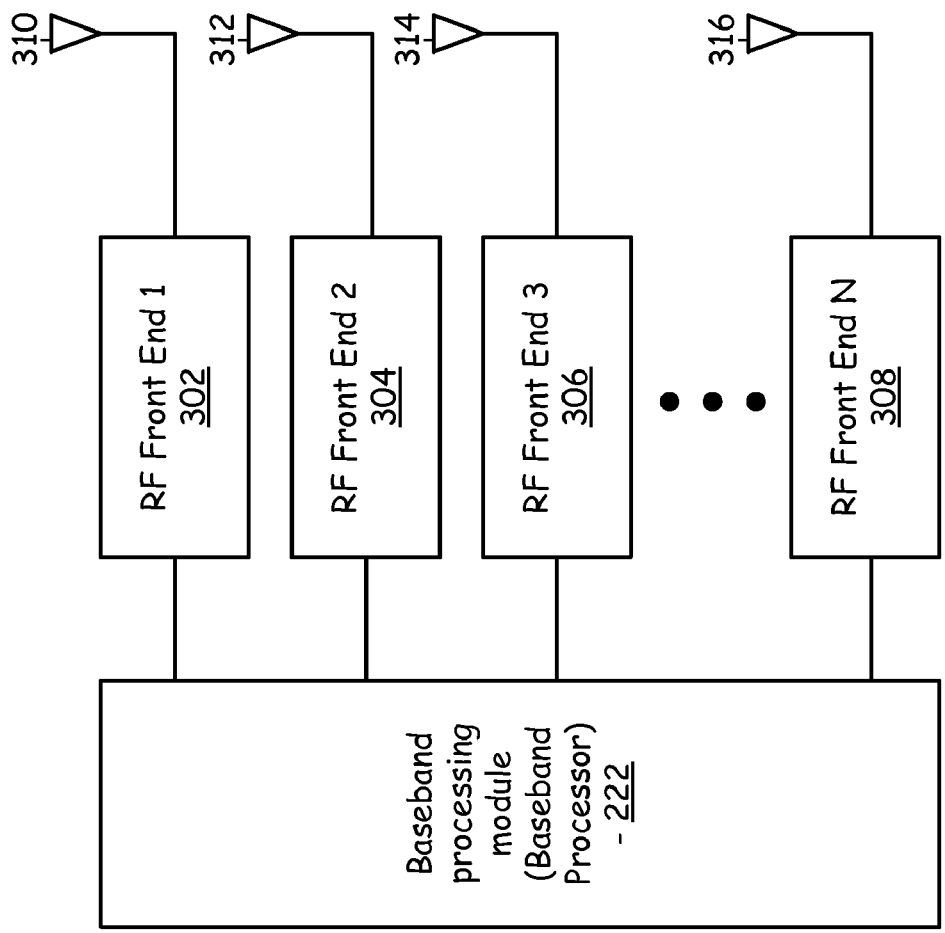
FIG. 3 is a block diagram illustrating a multiple Radio Frequency (RF) front end (receiver/transmitter) radio constructed according to an embodiment of the present invention.

FIG. 3 is a block diagram illustrating a multiple Radio Frequency (RF) front end (receiver/transmitter) radio 300 constructed according to an embodiment of the present invention. The radio 300 includes a baseband processing module 222 and a plurality of RF front ends, including RF front end 1 302, RF front end 2 304, RF front end 3 306, and RF front end N 308. These RF front ends 302, 304, 306, and 308 are serviced by antennas 310, 312, 318, and 316, respectively. The radio 300 may service a plurality of diversity paths of a single transmitted signal. Thus, in one simple embodiment of a diversity path implementation, the radio 300 includes a first RF front end 302, a second RF front end 304, and the baseband processing module 222. This embodiment will be described further with reference to FIG. 5. Alternately, the plurality of RF front ends 302-308 may service Multiple Input Multiple Output (MIMO) communications, each RF front end 302-308 assigned a respective MIMO data path. MIMO communications are currently implemented in WLAN implementations such as IEEE 802.11n. In either case, the principles of the present invention may be applied to a radio 300 having two or more RF front ends.

Figure 4:
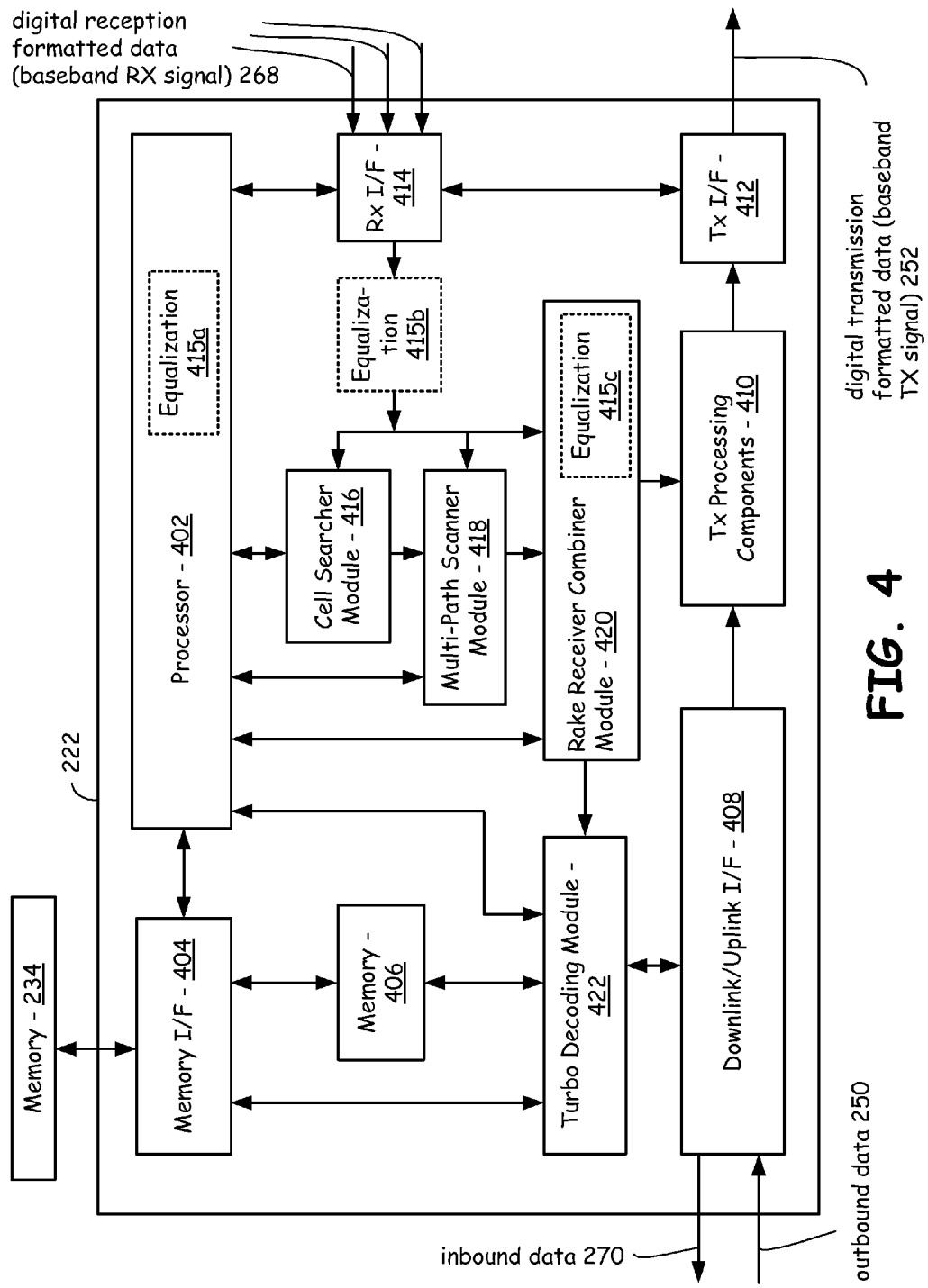
FIG. 4 is a block diagram illustrating components of a baseband processing module according to embodiments of the present invention.

FIG. 4 is a block diagram illustrating components of a baseband processing module 222 according to an embodiment of the present invention. The baseband processing module (baseband processor) 222 includes a processor 402, a memory interface 404, onboard memory 406, a downlink/uplink interface 408, TX processing components 410, and a TX interface 412. The baseband processing module 222 further includes an RX interface 414, a cell searcher module 416, a multi-path scanner module 418, a rake receiver combiner 420, and a turbo decoding module 422. The baseband processing module 222 couples in some embodiments to external memory 234. However, in other embodiments, memory 406 fulfills the memory requirements of the baseband processing module 402.

As was previously described with reference to FIG. 2, the baseband processing module receives outbound data 250 from coupled host processing components 202 and provides inbound data 270 to the coupled host processing components 202. Further, the baseband processing module 222 provides digital formatted transmission data (baseband TX signal) 252 to a coupled RF front end. The baseband processing module 222 receives digital reception formatted data (baseband RX signal) 268 from the coupled RF front end. As was previously described with reference to FIG. 2, an ADC 222 produces the digital reception formatted data (baseband RX data) 268 while the DAC 236 of the RF front end receives the digital transmission formatted data (baseband TX signal) 252 from the baseband processing module 222.

According to the particular embodiment of the present invention illustrated in FIG. 4, the downlink/uplink interface 408 is operable to receive the outbound data 250 from coupled host processing components, e.g., the host processing component 202 via host interface 220. Further, the downlink/uplink interface 408 is operable to provide inbound data 270 to the coupled host processing components 202 via the host interface 220. TX processing component 410 and TX interface 412 communicatively couple to the RF front end as illustrated in FIG. 2 and to the downlink/uplink interface 408. The TX processing components 410 and TX interface 412 are operable to receive the outbound data from the downlink/uplink interface 404, to process the outbound data to produce the baseband TX signal 252 and to output the baseband TX signal 252 to the RF front end as was described with reference to FIG. 2. RX processing components including the RX interface 414, rake receiver combiner 420 and in some cases the processor 402 are operable to receive the RX baseband signal 268 from the RF front end.

Equalization processing operations implemented in an RF receiver according to the present invention may be implemented by one or more of the components of the baseband processing module 222. In a first construct, the equalization operations are implemented as equalization operations 415a by processor 402. The equalization operations 415a may be implemented in software, hardware, or a combination of software and hardware. When the equalization operations 415a are implemented by software instructions, the processor 402 retrieves instructions via memory interface 404 and executes such software instructions to implement the equalization operations 415a.

In another construct, a dedicated equalization block 415b resides between the RX interface 414 and modules 416, 418, and 420 and performs the equalization operations of the present invention. With this construct, the equalization operations 415b may be implemented via hardware, software, or a combination of hardware and software. In another construct of the equalization operations according to the present invention, the equalization operations 415c are performed within rake receiver combiner module 420 by equalization operations 415c. The equalization operations 415c may be implemented via hardware, software, or a combination of these to execute the equalization operations of the present invention.

As is further shown in FIG. 4, the digital reception formatted data 268 may include a plurality of signal paths. Each one of these signal paths may be received from a respective RF front end such as was illustrated in FIG. 3 and described therewith. Thus, each of the digital reception formatted data versions 268 may be a different multi-path version of a single received signal or different RF signal such as in a MIMO system.

Figure 5:
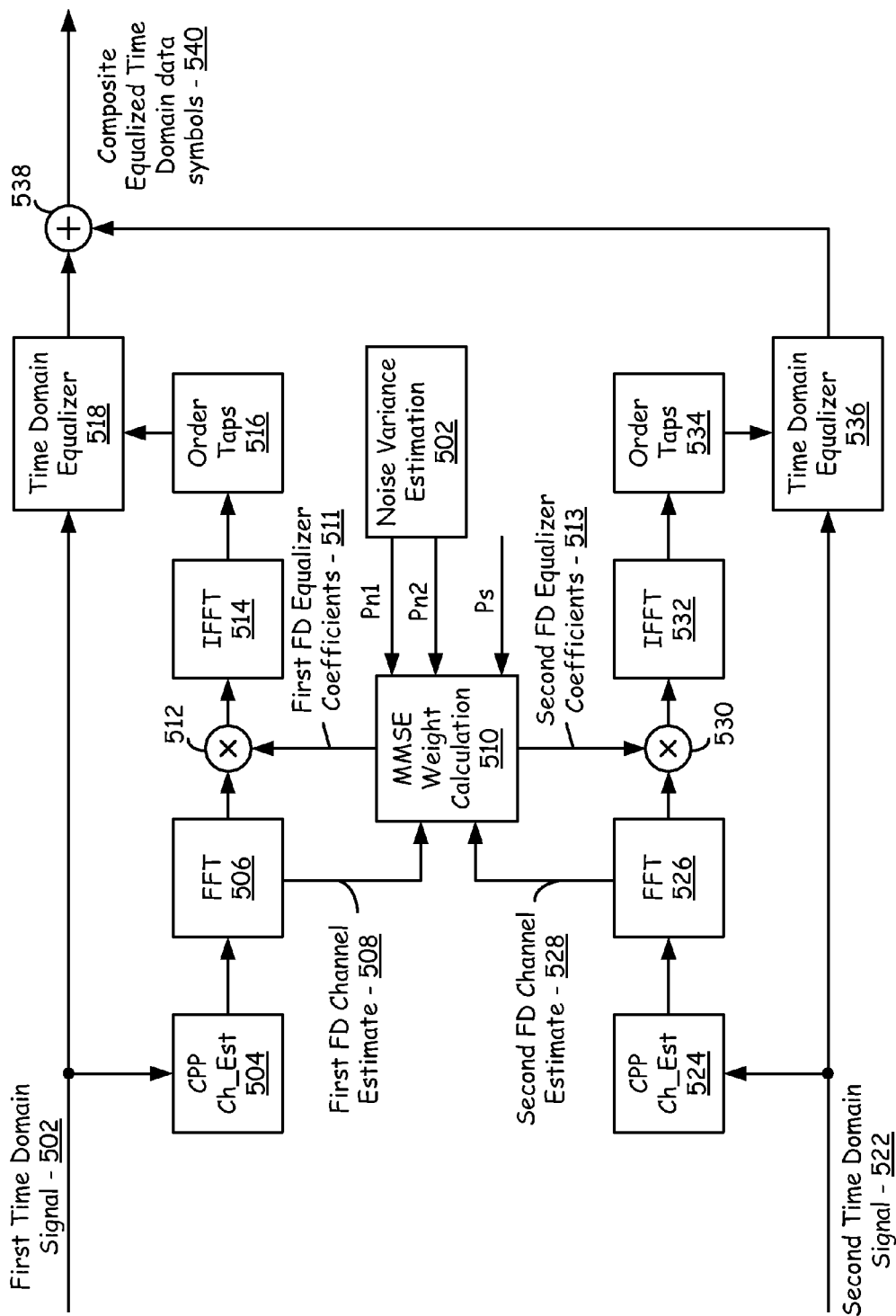
FIG. 5 is a block diagram illustrating equalization components of a baseband processing module according to a first embodiment of the present invention.

FIG. 5 is a block diagram illustrating equalization components of a baseband processing module according to a first embodiment of the present invention. These components of the baseband processing module 222 perform equalization operations according to the present invention. Of course, a baseband processing module 222 would include additional components in addition to as those illustrated in FIG. 5. The functional blocks of FIG. 5 may be implemented in dedicated hardware, general purpose hardware, software, or a combination of dedicated hardware, general purpose hardware, and software.

The components of the baseband processing module 222 of FIG. 5 include first diversity path components, second diversity path components, and shared components. As was described with reference to FIG. 3, an RF transceiver (transmitter/receiver), may include a plurality of receive signal paths. The plurality of receive signal paths may include components that operate upon different multi-path versions of a single transmitted signal or upon signals that include different data. According to the embodiment of FIG. 5, the functional components operate upon different multi-path versions of a single RF transmitted time domain signal.

The first diversity path component includes a cluster path processor/channel estimation block 504, a Fast Fourier Transform (FFT) block 506, multiplier 512, Inverse Fast Fourier Transform (IFFT) block 514, tap ordering block 516, and time domain equalizer 518. The second diversity path components include cluster path processing/channel estimation block 524, FFT block 526, multiplier 530, IFFT block 532, tap ordering block 534, and time domain equalizer 536. The shared processing blocks of the RF receiver of FIG. 5 include a Minimum Mean Square Error (MMSE) weight calculation block 510, a noise variance estimation block 502, and a combiner 538.

In its operations, the first diversity path operates upon a first time domain signal 502. The first time domain signal 502 includes first time domain training symbols and first time domain data symbols. As is generally known, frames of transmitted symbols in an RF system typically include a preamble that has training symbols and a payload portion that carries data symbols. The training symbols are used by channel estimation operations to produce equalizer coefficients that are then used for equalization of the data symbols. The CPP/channel estimation block 504 is operable to process the first time domain training symbols of the first time domain signal 502 to produce a first time domain channel estimate 508. The FFT block 506 is operable to convert the first time domain channel estimate to the frequency domain to produce a first frequency domain channel estimate 508.

Likewise, the second diversity path is operable to receive a second time domain signal 522 that includes second time domain training symbols and second time domain data symbols. The CPP/channel estimation block 524 is operable to process the second time domain training symbols to produce a second time domain channel estimate. The FFT block 526 is operable to convert the second time domain channel estimate to the frequency domain to produce a second frequency domain channel estimate 528.

The MMSE/weight calculation block 510 is operable to receive noise variance estimation parameters from noise variance estimation block 502 and to produce first frequency domain equalizer coefficients 511 and second frequency domain equalizer coefficients 513 based upon the first frequency domain channel estimate 508 and the second frequency domain channel estimate 528.

Referring again to the first diversity path, the multiplier 512 is operable to multiply an output of FFT block 506 with the first frequency domain equalizer coefficients 511. However, in another embodiment, the multiplier 518 simply passes through the first frequency domain equalizer coefficients 511. Then, the IFFT block 514 is operable to convert the first frequency domain equalizer coefficients 511, as operated upon by multiplier 512, to the time domain to produce first time domain equalizer coefficients. Next, the tap ordering block 516 is operable to order the first time domain equalizer coefficients to produce tap ordered time domain equalizer coefficients to the time domain equalizer 518. Time domain equalizer 518 is operable to equalize the first time domain data symbols using the first time domain equalizer coefficients received from tap ordering block 516.

Referring again to the second diversity path, the multiplier 530 is operable to multiply the second frequency domain equalizer coefficients 513 with an output received from FFT block 526. In another embodiment, the multiplier block 530 is operable to simply pass through the second frequency domain equalizer coefficients 513. The IFFT block 532 is operable to convert its input from the frequency domain to the time domain to produce second time domain equalizer coefficients. The tap ordering block 534 is operable to tap order the second time domain equalizer coefficients to produce an output of time domain equalizer. The time domain equalizer 536 is operable to equalize the second time data symbols using the second time domain equalizer coefficients. Finally, combiner 538 is operable to combine the equalized first time domain data symbols received from the first time domain equalizer 518 and the second equalized time domain data symbols received from time domain equalizer 536 to produce a composite time domain data symbols 540.

According to another aspect of the baseband processing module 222 of FIG. 5, the CPP/channel estimation block 504 is operable to cluster path process the first time domain training signals of the first time domain signal 502. Cluster path processing (CPP) is an operation that processes multi-path signal components that are relatively close to one another in time. A complete description of how cluster path processing is performed is described in co-pending patent application Ser. No. 11/173,854 filed Jun. 30, 2005 and entitled METHOD AND SYSTEM FOR MANAGING, CONTROLLING, AND COMBINING SIGNALS IN A FREQUENCY SELECTIVE MULTIPATH FADING CHANNEL, which is incorporated herein by reference in its entirety. With the cluster path processing operations completed, the CPP/channel estimation block 504 is operable to produce the first time domain channel estimate based upon cluster path processed first time domain training symbols. Further, with the second diversity path, the CPP/channel estimation block 522 may be operable to cluster path process the second time domain training symbols of the second time domain signal 522. Then, the CPP/channel estimation block 524 is operable to produce the second time domain channel estimate based upon the cluster path process second time domain training symbols.

In its operations, the MMSE weight calculation block 510 is operable to perform a MMSE algorithm on the first frequency domain equalizer coefficients 508 and the second frequency domain equalizer coefficients 528 to produce the first frequency domain equalizer coefficients 511 and the second frequency domain equalizer coefficients 513. One implementation of these operations is described below. Other operations may be used to generate equalizer coefficients according to the present invention that differ from those described below.

With the particular implementation described herein, in the time domain, a matrix signal model at each antenna servicing the dual diversity path structure of FIG. 5 may be characterized as:

$$y_i = H_i x + n_i \quad i=1,2 \tag{Eq. 1}$$

The channel matrix $H_i$ can be modeled as a circulant matrix which satisfies $$H_1 = F^{-1} \Lambda_1 F; \quad H_2 = F^{-1} \Lambda_2 F \tag{Eq. 2}$$

where F is the orthogonal discrete Fourier transform matrix.

By multiplying by matrix F at both sides of the Eq. (1), a frequency domain channel model is represented as:

$$Y_i = F y_i = \Lambda^i X + N_i \tag{Eq. 3}$$

where $X = Fx$; $N_i = F n_i$ $i = 1,2$

The channel model may be considered at the k-th subcarrier in the frequency domain as:

$$Y[k] = \Lambda_k X[k] + N[k] \tag{Eq. 4}$$

where $$Y[k] = \begin{bmatrix} Y_1[k] \\ Y_2[k] \end{bmatrix}, \Lambda_k = \begin{bmatrix} \Lambda_k^1 \\ \Lambda_k^2 \end{bmatrix} \text{ and } N[k] = \begin{bmatrix} N_1[k] \\ N_2[k] \end{bmatrix} \tag{Eq. 5}$$

are 2×1 vectors.

The MMSE optimum weight at the k-th subcarrier is therefore represented by:

$$C[k] = E(Y[k]^* Y[k]^T)^{-1} E(Y[k]^* X) = (\Lambda_k^* \Lambda_k^T + C_{nn})^{-1} \Lambda_k \tag{Eq. 6}$$

Thus, the estimated transmitted signal is given as $$\hat{X}[k] = C[k]^H Y[k] = \frac{\frac{(n1 * \Lambda_k^{1*} Y_1[k])}{ant1} + \frac{n2 * \Lambda_k^{2*} Y_2[k]}{ant2}}{|\Lambda_k^1|^2 n2 + |\Lambda_k^2|^2 n1 + n1 n2} \tag{Eq. 7}$$

After simplifying Eq (7), the MMSE-FDE weight(s) for dual diversity path configuration of FIG. 5 is given as:

$$C_k^i = \frac{\left(\frac{\sigma_s}{\sigma_n^i}\right)^2 \Lambda_k^{i*}}{1 + \sum_{l=1}^{2} \left(\frac{\sigma_s}{\sigma_n^i}\right)^2 |\Lambda_k^l|^2}; i = 1, 2 \ k = 1, 2 \ldots N \tag{Eq. 8}$$

The time domain signal after Equalization is given by:

$$z = F^{-1} CY \tag{Eq. 9}$$
$$= \underbrace{F^{-1} C^1 \Lambda_1 F H_1 x}_{FD\_EQ1} + \underbrace{F^{-1} C^2 \Lambda_2 F H_2 x}_{FD\_EQ2} +$$
$$F^{-1} C^1 N_1 + F^{-1} C^2 N_2$$

$$z = F^{-1} CY \tag{Eq. 10}$$
$$= \underbrace{F^{-1}(C^1) \otimes y}_{Proposed\_EQ1} + \underbrace{F^{-1}(C^2) \otimes y}_{Proposed\_EQ2} +$$
$$F^{-1} C^1 N_1 + F^{-1} C^2 N_2$$

Figure 6:
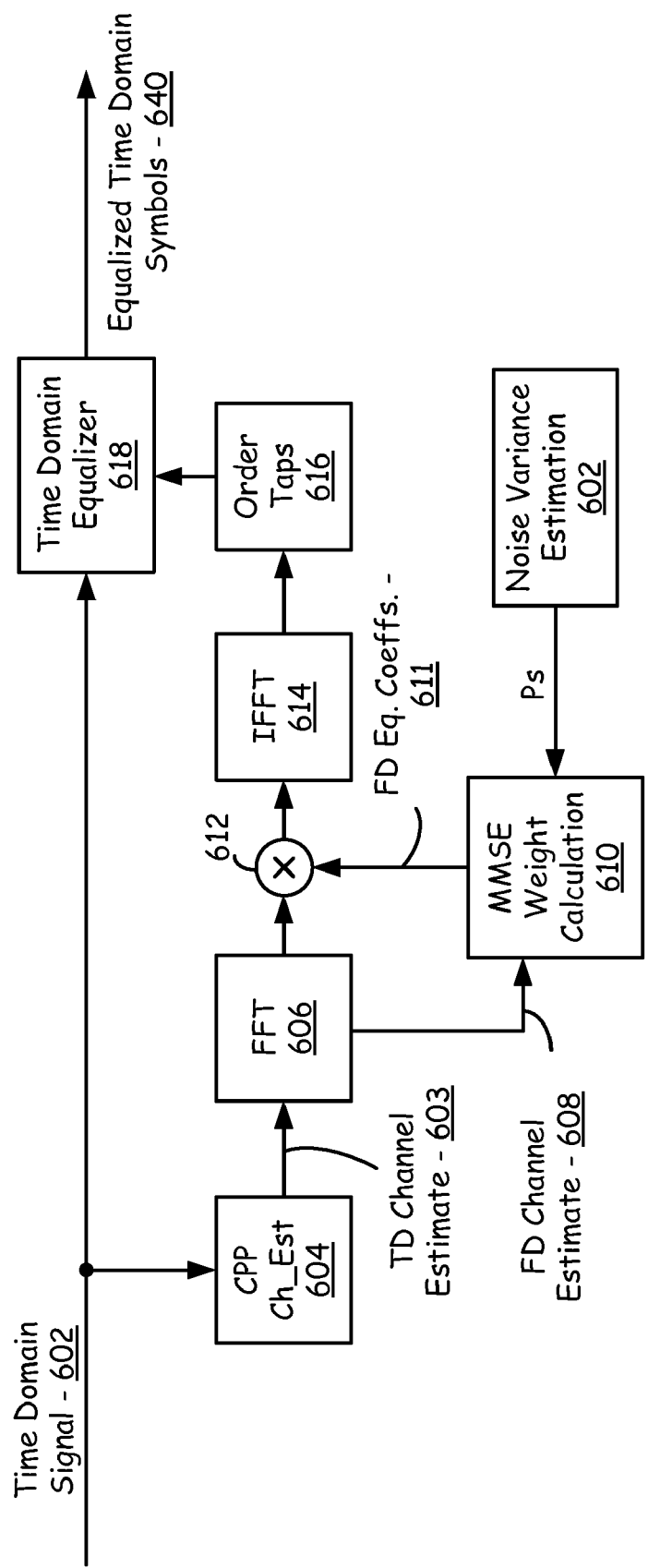
FIG. 6 is a block diagram illustrating equalization components of a baseband processing module according to a first embodiment of the present invention.

FIG. 6 is a block diagram illustrating equalization components of a baseband processing module according to a first embodiment of the present invention. The components of the baseband processing module 222 are operable to receive a time domain signal 602 from an RF front end such as was illustrated in FIG. 2. The time domain signal 602 includes time domain training symbols and time domain data symbols. The components of FIG. 6 include channel estimation block 604, an FFT block 606, a weight calculator block 610, an IFFT block 614, a tap ordering block 616, and a time domain equalizer 618. The channel estimation block 604 is operable to process the time domain training symbols of the time domain signal 602 to produce a time domain channel estimate 603. The FFT block 606 is operable to convert the time domain channel estimate 603 to the frequency domain to produce a frequency domain channel estimate 608. The weight calculation block 610 is operable to produce frequency domain equalizer coefficients based upon the frequency domain channel estimate 608 and noise variation estimation received from noise variation estimation block 602. Multiplier 612 receives the frequency domain equalizer coefficient 611 and the receiving input from the FFT block 606. The multiplier 612 produces an output to IFFT block 614 that converts the frequency domain equalizer coefficient 611, as may have been modified by multiplier 612, to produce time domain equalizer coefficients. Tap ordering block 616 tap orders the time domain equalizer coefficients and produces the tap ordered time domain equalizer coefficients to time domain equalizer 616. The time domain equalizer 616 is operable to equalize the time domain data symbols of the time domain signal 602 using the time domain equalizer coefficients to produce equalized time domain symbols 640.

The channel estimation block 604 may also perform cluster path processing operations as were previously described with reference to FIG. 5. When performing cluster path processing operations to produce the time domain training symbols, the CPP/channel estimation block 604 may produce the time domain channel estimate based upon the cluster path processed time domain training symbols. The MMSE weight calculation block 610 may perform MMSE algorithm on the frequency domain equalizer coefficients to produce the frequency domain equalizer coefficients.

Figure 7:
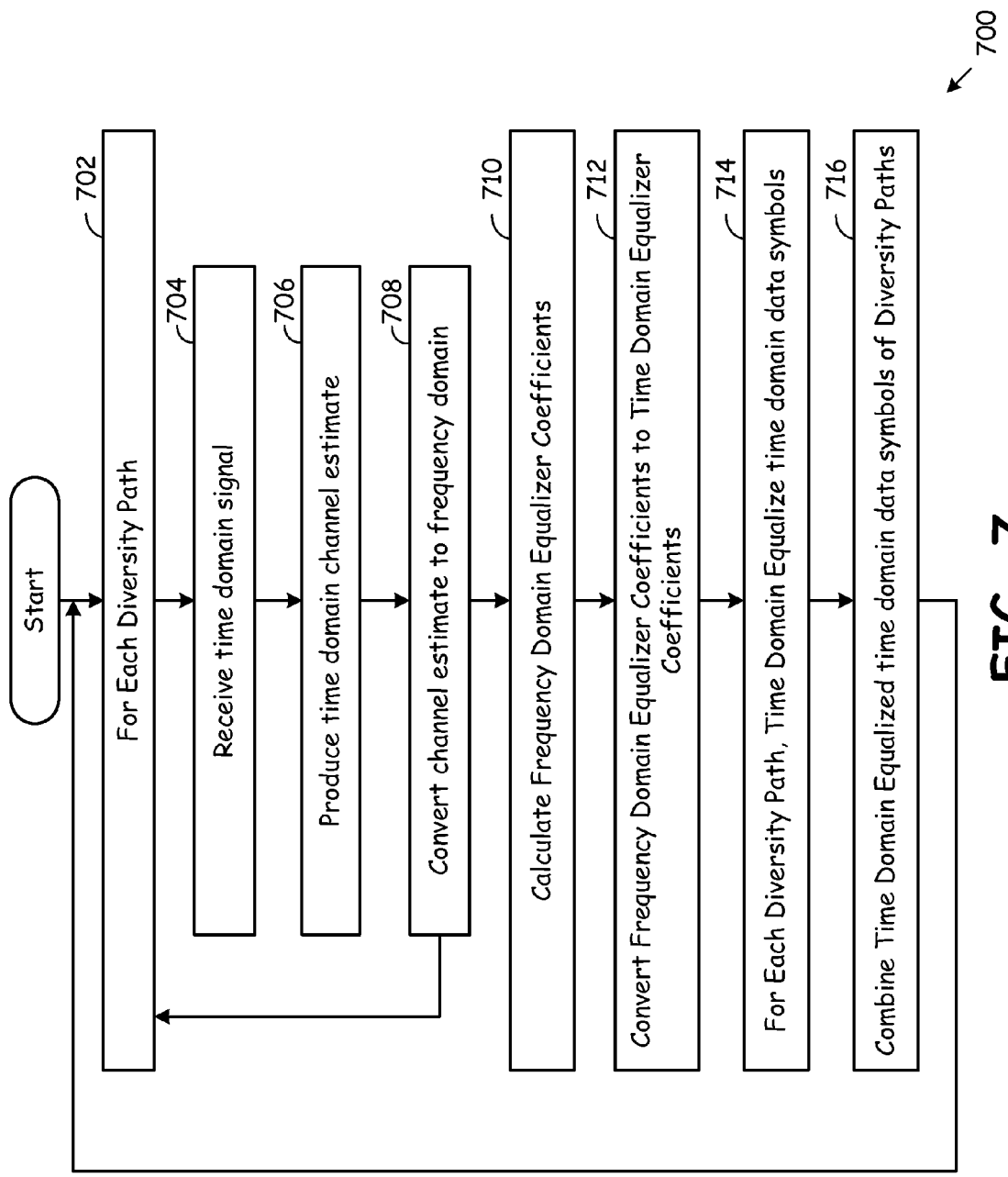
FIG. 7 is a flow chart illustrating equalization operations according to an embodiment of the present invention.

FIG. 7 is a flow chart illustrating equalization operations according to an embodiment of the present invention. The operation 700 commences with operations for each of at least two diversity paths (Step 702). As was previously described with reference to FIG. 3, a radio may include a plurality of RF front ends 302-308, each servicing a respective diversity path. Thus, referring again to FIG. 7, operations 704-708 are performed for each diversity path. In particular, for each diversity path, the baseband processing module receives a corresponding time domain signal that includes corresponding time domain training symbols and corresponding time domain data symbols.

With reference to a first diversity path, operation includes receiving a first time domain signal that includes first time domain training symbols and first time domain data symbols. Operation then includes processing the first time domain training symbols to produce a first time domain channel estimate (Step 706). Further, operation includes converting the time domain channel estimates to the frequency domains to produce a first frequency domain channel estimate (Step 708).

With respect to a second diversity path, operation includes receiving a second time domain signal that includes second time domain training symbols and second time domain data symbols (Step 704). Operation for the second diversity path further includes processing the second time domain training symbols to produce a second time domain channel estimate (Step 706). Further, operation includes converting the second time domain channel estimate to the frequency domain to produce a second frequency domain channel estimate (Step 708).

When the operations of Steps 702-708 have been completed for each diversity path, operation proceeds to Step 710 where frequency domain equalizer coefficients are produced for each of a plurality of diversity paths. For the particular example of the structure of FIG. 5 that includes two diversity paths, the operation at Step 710 includes producing first frequency domain equalizer coefficients and second frequency domain equalizer coefficients based upon the first frequency domain channel estimate and the second frequency domain channel estimate. Operation then includes converting the frequency domain equalizer coefficients to time domain equalizer coefficients (Step 712). For the particular case of a first and a second diversity path, the operation at Step 712 would include converting the first frequency domain equalizer coefficients to the time domain to produce first time domain equalizer coefficients and converting the second frequency domain equalizer coefficients to the time domain to produce second time domain equalizer coefficients.

Operation then includes, for each diversity path, time domain equalizing respective time domain data symbols (Step 714). For the particular case of a first and a second diversity path, the operations of Step 714 include equalizing the first time domain data symbols using the first time domain equalizer coefficients and equalizing the second time domain data symbols using the second time domain equalizer coefficients. Finally, operation includes combining the equalized time domain data symbols from a plurality of diversity paths (Step 716). For the particular case of the first and second diversity paths, the operation of Step 716 includes combining the equalized first time domain data symbols and the second equalized time domain data symbols to produce composite time domain data symbols.

The operations 702-716 are repeated each time new equalizer coefficients are produced based upon received physical layer frames that include training symbols. In many RF receivers, the operations 700 of FIG. 7 are repeated for each received physical layer frame. However, in other embodiments, channel estimation is performed periodically based upon detected changes of channel conditions or when a time constraint is met.

The operations at Step 706 may include cluster path processing as has been previously described. When cluster processing is performed, the time domain channel estimate include cluster path processed time domain training symbols. Fast Fourier transformations are employed in converting from the time domain to the frequency domain while Inverse Fast Fourier transformations are to employed to convert from the frequency domain to the time domain. The operations at Step 710 may include using an MMSE algorithm to produce the frequency domain equalizer coefficients based upon the channel estimates received. The operations of FIG. 7 may support various types of systems including cellular wireless communication systems, wireless metropolitan area communication systems (such as the WiMAX) standards, WLAN communication operations, and WPAN communication operations.

Figure 8:
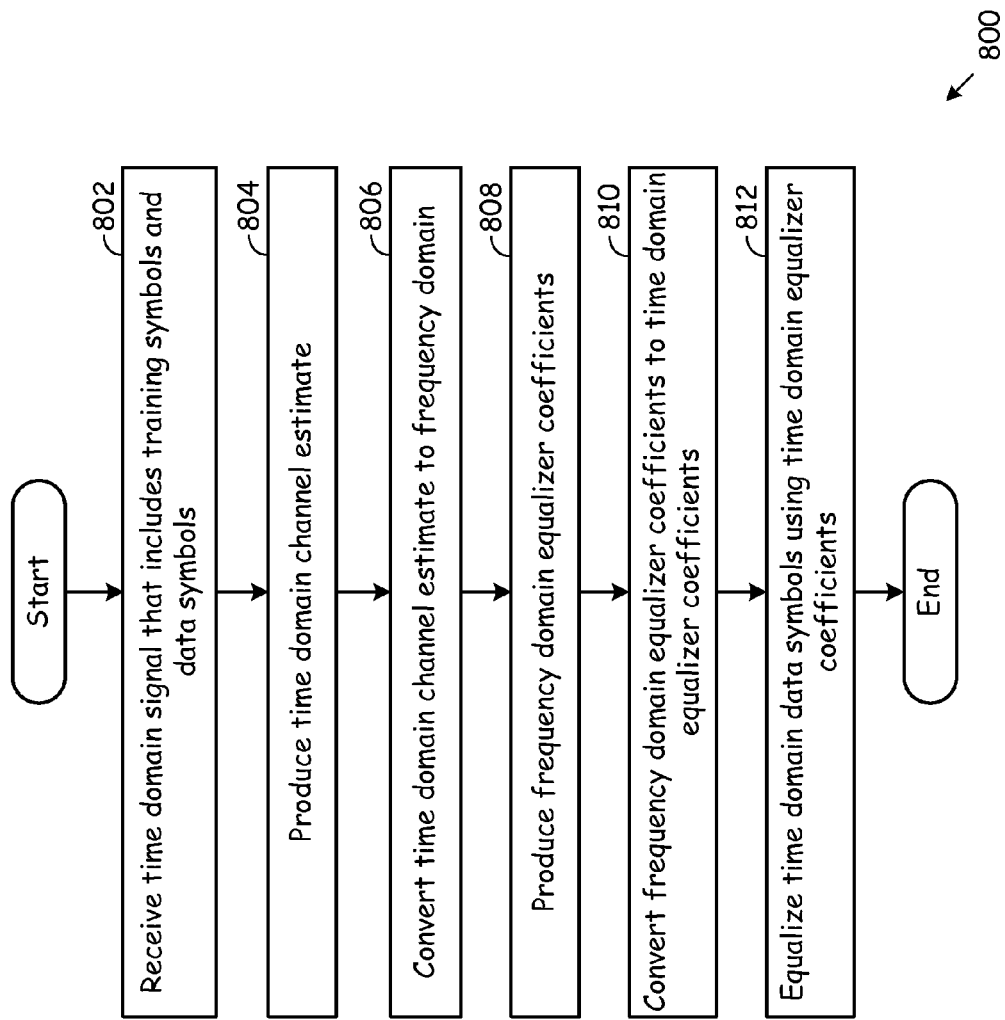
FIG. 8 is a flow chart illustrating equalization operations according to an embodiment of the present invention.

FIG. 8 is a flow chart illustrating equalization operations according to an embodiment of the present invention. Operation 800 includes first receiving a time domain signal that includes time domain training symbols and time domain data symbols (Step 802). Operation continues with processing the time domain training symbols to produce a time domain channel estimate (Step 804). Operation continues with converting the time domain channel estimate to the frequency domain to produce a frequency domain channel estimate (Step 806).

Operation further includes producing frequency domain equalizer coefficients based upon the frequency domain channel estimate produced at Step 806 (Step 808). Then, operation includes converting the frequency domain equalizer coefficients to the time domain to produce time domain equalizer coefficients (Step 810). Operation concludes with equalizing the time domain data symbols using the time domain equalizer coefficients produced at Step 810 (Step 812). From Step 812 operation ends. Of course, the operations 800 of FIG. 8 may be repeated for each received physical layer frame that includes training symbols and data symbols. The various specific implementations that were previously described with FIGS. 1-7 may be employed with the operations 800 of FIG. 8 as well and will not be described herein further with respect to FIG. 8.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A method for operating a Radio Frequency (RF) device comprising:
    an RF interface receiving a time domain signal that includes time domain training symbols and time domain data symbols;
    processing circuitry cluster path processing the time domain training symbols to produce cluster path processed time domain training symbols;
    the processing circuitry producing a time domain channel estimate based upon the cluster path processed time domain training symbols;
    the processing circuitry converting the time domain channel estimate to the frequency domain to produce a frequency domain channel estimate; and
    the processing circuitry producing frequency domain equalizer coefficients based upon the frequency domain channel estimate.

2. The method of claim 1, further comprising:
    the processing circuitry converting the frequency domain equalizer coefficients to the time domain to produce time domain equalizer coefficients; and
    the processing circuitry equalizing the time domain data symbols using the time domain equalizer coefficients.

3. The method of claim 2, wherein converting the frequency domain equalizer coefficients to the time domain to produce time domain equalizer coefficients comprises:
    the processing circuitry Inverse Fast Fourier Transforming the frequency domain equalizer coefficients to produce the time domain equalizer coefficients; and
    the processing circuitry tap ordering the time domain equalizer coefficients.

4. The method of claim 1, wherein the processing circuitry produces the frequency domain equalizer coefficients based upon the frequency domain channel estimate by performing a Minimum Mean Squared Error (MMSE) algorithm.

5. The method of claim 1, further comprising supporting wireless operations selected from the group consisting of cellular wireless communications, wireless metropolitan area network communications, wireless local area network communications, and wireless personal area network communications.

6. A Radio Frequency (RF) device comprising:
    a RF front end operable to receive an RF signal and to produce a time domain signal that includes time domain training symbols and time domain data symbols; and
    processing circuitry coupled to the RF front end and operable to:
        cluster path process the time domain training symbols to produce cluster path processed time domain training symbols;
        produce a time domain channel estimate based upon the cluster path processed time domain training symbols;
        convert the time domain channel estimate to the frequency domain to produce a frequency domain channel estimate; and
        produce frequency domain equalizer coefficients based upon the frequency domain channel estimate.

7. The RF device of claim 6, wherein the processing circuitry is further operable to convert the frequency domain equalizer coefficients to the time domain to produce time domain equalizer coefficients; and
    equalize the time domain data symbols using the time domain equalizer coefficients.

8. The RF device of claim 7, wherein in converting the frequency domain equalizer coefficients to time domain equalizer coefficients, the processing circuitry is operable to:
    Inverse Fast Fourier Transform the frequency domain equalizer coefficients to produce the time domain equalizer coefficients; and
    tap order the time domain equalizer coefficients.

9. The RF device of claim 6, wherein in producing the frequency domain equalizer coefficients based upon the frequency domain channel estimate, the processing circuitry is operable to perform a Minimum Mean Squared Error (MMSE) algorithm to produce the frequency domain equalizer coefficients.

10. The RF receiver of claim 6, wherein the RF device supports wireless communications selected from the group consisting of cellular wireless communications, wireless metropolitan area network communications, wireless local area network communications, and wireless personal area network communications.

11. A method for operating a Radio Frequency (RF) device comprising:
    at least one RF interface receiving a first time domain signal and a second time domain signal, each including time domain training symbols and time domain data symbols;
    for each of the first time domain signal and the second time domain signal, processing circuitry:
        processing the time domain signal to produce time domain training symbols;
        producing a time domain channel estimate based upon the time domain training symbols;
        converting the time domain channel estimate to the frequency domain to produce a frequency domain channel estimate;
        producing frequency domain equalizer coefficients based upon the frequency domain channel estimate;
        converting the frequency domain equalizer coefficients to the time domain to produce time domain equalizer coefficients; and
        equalizing time domain data symbols using the time domain equalizer coefficients to produced equalized time domain data symbols; and
    the processing circuitry combining equalized time domain data symbols of the first time domain signal and equalized time domain data symbols of the second time domain signal to produce composite equalized time domain data symbols;

wherein producing a time domain channel estimate based upon the time domain training symbols comprises cluster path processing the time domain training symbols to produce the time domain channel estimate.

12. The method of claim 11, wherein converting the frequency domain equalizer coefficients to the time domain to produce time domain equalizer coefficients comprises:
the processing circuitry Inverse Fast Fourier Transforming the frequency domain equalizer coefficients to produce the time domain equalizer coefficients; and
the processing circuitry tap ordering the time domain equalizer coefficients.

13. The method of claim 11, wherein the processing circuitry produces the frequency domain equalizer coefficients based upon the frequency domain channel estimate by performing a Minimum Mean Squared Error (MMSE) algorithm.

14. The method of claim 11, further comprising supporting wireless operations selected from the group consisting of cellular wireless communications, wireless metropolitan area network communications, wireless local area network communications, and wireless personal area network communications.

15. A Radio Frequency (RF) device comprising:
at least one RF interface operable to receive a first time domain signal and a second time domain signal, each including time domain training symbols and time domain data symbols;
processing circuitry coupled to the at least one RF interface and operable to:
for each of the first time domain signal and the second time domain signal:
produce a time domain channel estimate based upon the time domain training symbols;
convert the time domain channel estimate to the frequency domain to produce a frequency domain channel estimate;
produce frequency domain equalizer coefficients based upon the frequency domain channel estimate;
convert the frequency domain equalizer coefficients to the time domain to produce time domain equalizer coefficients; and
equalize time domain data symbols using the time domain equalizer coefficients to produced equalized time domain data symbols; and
combine equalized time domain data symbols of the first time domain signal and equalized time domain data symbols of the second time domain signal to produce composite equalized time domain data symbols,
wherein in producing the time domain channel estimate based upon the time domain training symbols, the processing circuitry is operable to cluster path process the time domain training symbols to produce the time domain channel estimate.

16. The RF device of claim 15, wherein in converting the frequency domain equalizer coefficients to the time domain to produce the time domain equalizer coefficients, the processing circuitry is operable to:
Inverse Fast Fourier Transform the frequency domain equalizer coefficients to produce the respective time domain equalizer coefficients; and
tap order the time domain equalizer coefficients.

17. The RF device of claim 15, wherein the processing circuitry is operable to produce frequency domain equalizer coefficients based upon the frequency domain channel estimate by performing a Minimum Mean Squared Error (MMSE) algorithm.

18. The RF device of claim 15, further comprising supporting wireless operations selected from the group consisting of cellular wireless communications, wireless metropolitan area network communications, wireless local area network communications, and wireless personal area network communications.

* * * * *

UNITED STATES PATENT AND TRADEMARK OFFICE
CERTIFICATE OF CORRECTION

| | | |
|---|---|---|
| PATENT NO. | : 7,907,662 B2 | Page 1 of 1 |
| APPLICATION NO. | : 12/703311 | |
| DATED | : March 15, 2011 | |
| INVENTOR(S) | : Li et al. | |

It is certified that error appears in the above-identified patent and that said Letters Patent is hereby corrected as shown below:

Col. 14, line 64, in claim 11: replace "produced" with --produce--
Col. 16, line 7, in claim 15: replace "produced" with --produce--

Signed and Sealed this
Second Day of October, 2012

David J. Kappos
*Director of the United States Patent and Trademark Office*